United States Patent [19]

Katagiri et al.

[11] 4,447,066
[45] May 8, 1984

[54] SEALING BOOT

[75] Inventors: Masayoshi Katagiri, Toyota; Toshio Kondo, Okazaki; Masanori Midooka, Inazawa, all of Japan

[73] Assignees: Toyota Jidosha Kabushiki Kaisha; Aisin Seiki Kabushiki Kaisha; Toyoda Gosei, all of Aichi, Japan

[21] Appl. No.: 474,479

[22] Filed: Mar. 11, 1983

[30] Foreign Application Priority Data

Mar. 19, 1982 [JP] Japan .................... 57-39940

[51] Int. Cl.$^3$ ............................. F16J 15/52
[52] U.S. Cl. ..................... 277/212 FB; 277/205; 74/18.1
[58] Field of Search ......... 277/212 F, 212 FB, 212 R, 277/205; 74/18, 18.1, 18.2; 403/50, 51

[56] References Cited

U.S. PATENT DOCUMENTS

| | | | |
|---|---|---|---|
| 4,114,460 | 9/1978 | Oto | 277/212 FB X |
| 4,132,422 | 1/1979 | Sankey et al. | 277/212 FB |
| 4,199,159 | 4/1980 | Evans | 277/212 FB |
| 4,270,442 | 6/1981 | Bainard et al. | 277/212 FB X |
| 4,324,318 | 4/1982 | Karasudani | 277/212 FB X |
| 4,327,925 | 5/1982 | Alexander et al. | 277/212 FB |

FOREIGN PATENT DOCUMENTS

| | | | |
|---|---|---|---|
| 1090113 | 9/1960 | Fed. Rep. of Germany | 277/212 FB |
| 1181014 | 11/1964 | Fed. Rep. of Germany | 277/212 FB |
| WO81/00371 | 2/1971 | PCT Int'l Appl. | |
| 1239228 | 7/1971 | United Kingdom | 277/212 FB |
| 703712 | 12/1979 | U.S.S.R. | 277/212 FB |

Primary Examiner—Robert S. Ward
Attorney, Agent, or Firm—Parkhurst & Oliff

[57] ABSTRACT

A sealing boot of elastomeric material for hermetically closing an annular opening between support and movable members in relatively reciprocable relationship, the sealing boot including a tubular bellows portion which is integrally formed at the opposite ends thereof with a pair of cylindrical sealing portions respectively attached to the support and movable members, and wherein one of the cylindrical sealing portions is formed with a cylindrical sealing surface to be tightly in contact with the outer circumference of either the support or movable member and is further formed at its inner end with an annular flank which is curved radially away from the cylindrical sealing surface.

9 Claims, 7 Drawing Figures

SEALING BOOT

BACKGROUND OF THE INVENTION

The present invention relates to sealing boots, and more particularly to a sealing boot of elastomeric material for hermetically closing an annular opening between support and movable members in relatively reciprocable relationship, the sealing boot including a bellows portion which is integrally formed at the opposite ends thereof with a pair of cylindrical sealing portions respectively attached to the support and movable members.

In general, such a sealing boot as described above has been adapted for use with sliding portion in an hydraulically operated disc brake assembly of the pin-slide type, a sliding portion in a piston and wheel cylinder assembly or the like to prevent entry of water and dirt into an annular opening at the sliding portion. For example, in a conventional sealing boot as shown in FIG. 7, a cylindrical sealing portion 2 integrally formed therewith has a cylindrical sealing surface 2a to be tightly attached within an annular groove 1a of a pin-bush 1 and an inner side-surface 2b substantially perpendicular to the inner end $2a_1$ of surface 2a. When, upon assembly, the pin-bush 1 is inserted in the direction of the arrow in the figure, the cylindrical sealing portion 2 is inverted in the annular groove 1a due to abutment against a tapered end of pin-bush 1 at its inner side-surface 2b and remains as it is. This requires attachment of the cylindrical sealing portion 2 within the annular groove 1a by hand as is illustrated by an imaginary line in the figure, resulting in time consumption during the assembling process of the sealing boot.

SUMMARY OF THE INVENTION

It is, therefore, a primary object of the present invention to provide an improved sealing boot of elastomeric material the cylindrical sealing portion of which is naturally coupled in place within an annular groove of a support or movable member by its self-return force even when inverted during the assembling process.

According to the present invention there is provided a sealing boot of elastomeric material for hermetically closing an annular opening between support and movable members in relatively reciprocable relationship, the sealing boot includes a bellows portion which is integrally formed at the opposite ends thereof with a pair of cylindrical sealing portions respectively attached to the support and movable members, and wherein one of the cylindrical sealing portions is formed with a cylindrical sealing surface to be tightly in contact with the outer circumference of either the support or movable member and is further formed at its inner end with an annular flank which is curved radially away from the cylindrical sealing surface. Preferably, the one of the cylindrical sealing portions is further formed at its outer end with an annular flank which is curved radially away from the cylindrical sealing surface, and a joint portion beween the bellows portion and the cylindrical sealing portion is thickened radially inwardly, in necessity.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
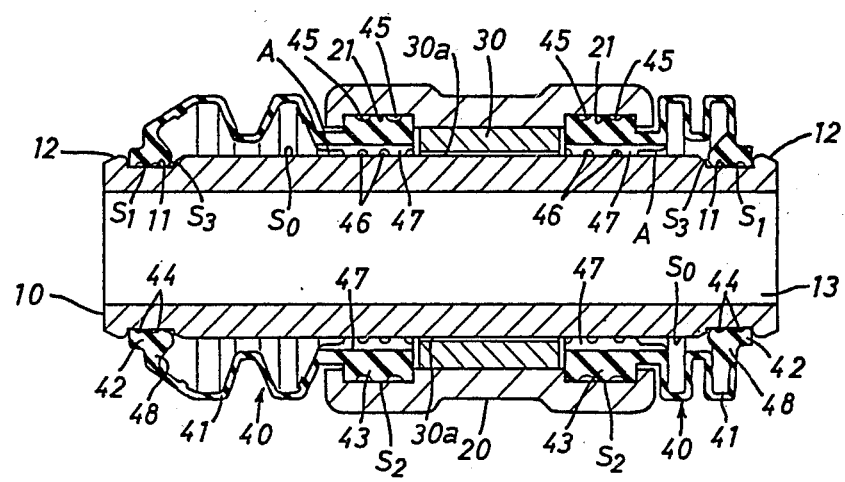
FIG. 1 is a part sectional view of parts of a hydraulically operated disc brake assembly, including support and movable members provided with a pair of sealing boots in accordance with the present invention.

Referring now to the drawings, FIG. 1 illustrates a sliding portion in an hydraulically operated disc brake assembly of the pin-slide type for vehicles, where a movable member in the form of a pin-support portion 20 of a movable calliper (not shown) is coupled over a support member in the form of a pin-bush 10 and is axially reciprocable on pin-bush 10 through a metal bearing 30 fixed therein, the metal bearing 30 being formed with axial slits 30a. The pin-bush 10 is formed at the opposite end portions thereof with a pair of annular grooves 11, 11 and a pair of tapered annular shoulders 12, 12. The pin-bush 10 has an axial bore 13 through which a bolt (not shown) is inserted to connect the pin-bush 10 to a mounting structure (not shown) of the disc brake assembly. On the other hand, the opposite end portions of pin-support portion 20 are formed therein with a pair of annular grooves 21, 21.

In such an arrangement at the sliding portion as described above, a pair of tubular sealing boots 40, 40 are assembled between pin-bush 10 and pin-support portion 20 respectively. Each tubular sealing boot 40 is made of elastomeric material such as synthetic rubber and includes a bellows portion 41 which is integrally formed at the outer end thereof with a cylindrical sealing portion 42 and at the inner end thereof with a cylindrical sealing portion 43. The cylindrical sealing portion 42 of bellows 41 is attached within the annular groove 11 of pin-bush 10, while the cylindrical sealing portion 43 of bellows 41 is attached within the annular groove 21 of pin-support portion 20 in such a manner that the bellows portion 41 is arranged to prevent entry of water and dirt into an annular opening A between pin-bush 10 and pin-support portion 20. The cylindrical sealing portion 42 is formed at its inner periphery with a cylindrical sealing surface $S_1$ to be tightly in contact with the annular groove 11, the cylindrical sealing surface $S_1$ being formed with two parallel annular grooves 44. The cylindrical sealing portion 43 is slidably in contact with the outer circumference $S_0$ of pin-bush 10 to prevent adhesion of dirt on pin-bush 10. For this purpose, the cylindrical sealing portion 43 is formed at its inner periphery with two parallel annular grooves 46, 46 and axial slots 47. The cylindrical sealing portion 43 is further formed at its outer periphery with a cylindrical sealing surface $S_2$ to be tightly in contact with the annular groove 21, the cylindrical sealing surface $S_2$ being formed with two parallel annular grooves 45, 45.

Figure 2:
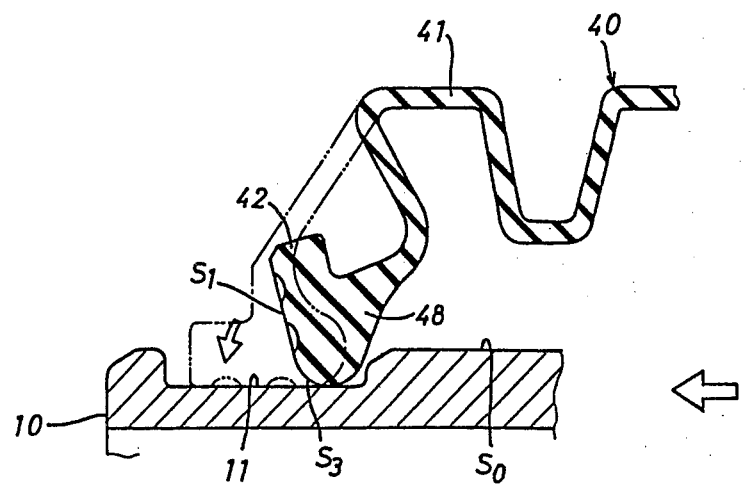
FIG. 2 is an enlarged cross-sectional view of the sealing boot of FIG. 1.

As can be well seen in FIGS. 1 and 2, the tubular sealing boot 40 in this embodiment is characterized in that the cylindrical sealing portion 42 is formed at its inner end with an annular flank $S_3$ which is curved radially away from the cylindrical sealing surface $S_1$ and that a joint portion between portions 41 and 42 is thickened radially inwardly toward the interior of boot 40. During the assembling process of each boot 40, the inside cylindrical sealing portion 43 is previously attached within the annular groove 21 of pin-support portion 20, and the pin-bush 10 is inserted into the outside cylindrical sealing portion 42 in the direction of the arrow in FIG. 2. At this assembling stage, even when inverted temporarily as is illustrated in FIG. 2, the outside cylindrical sealing portion 42 will be naturally coupled in place within the annular groove 11 of pin-bush 10 by its self-return force. In such instance, the annular flank $S_3$ causes rotation of the cylindrical sealing portion 42 toward the bottom of annular groove 11 under a self-return force of joint portion 48. This serves to eliminate time consumption for attachment of the cylindrical sealing portion 42 in place.

Figure 3:
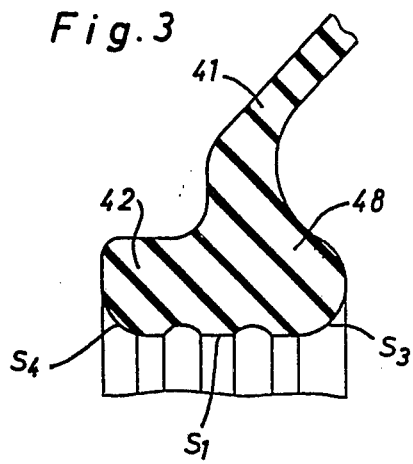
FIGS. 3 to 6 each illustrate cross-sectional views of modifications of the boot of FIG. 1 in an enlarged scale.
Figure 4:
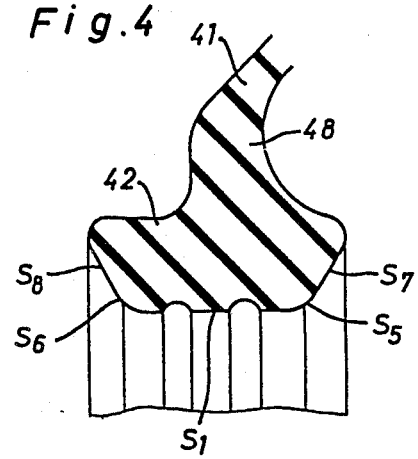
Figure 5:
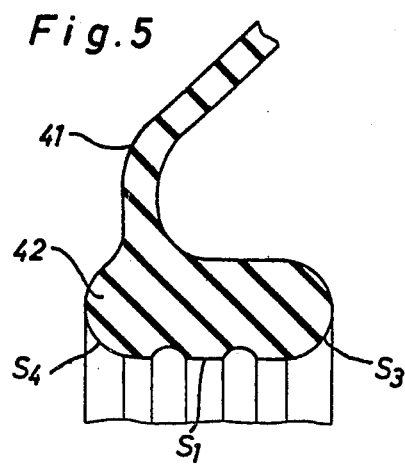
Figure 6:
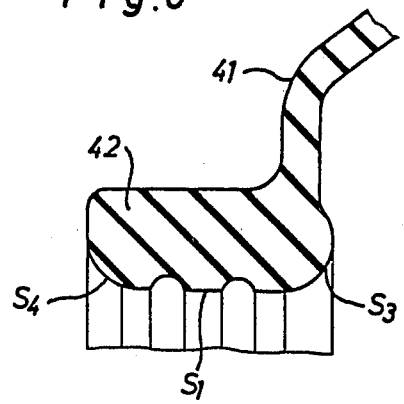
Figure 7:
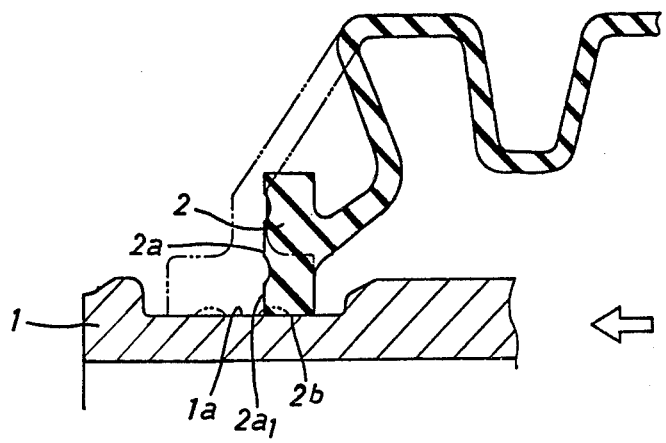
FIG. 7 is an enlarged cross-sectional view of a conventional sealing boot.

In the actual practice of the present invention, as is shown in FIG. 3, the cylindrical sealing portion 42 may be formed at its outer end with an annular flank $S_4$ which is curved radially away from the cylindrical sealing surface $S_1$. With such a construction, when inverted in an opposite direction, the outside cylindrical sealing portion 42 will be naturally coupled in place within the annular groove 11. Alternatively, as is shown in FIG. 4, the cylindrical sealing portion 42 may be formed at its opposite ends with a pair of annular flanks $S_5$, $S_6$ which are respectively curved radially away from the cylindrical sealing surface $S_1$, and further may be formed with a pair of tapered annular side-surfaces $S_7$, $S_8$ radially extending from annular flanks $S_5$, $S_6$ respectively. In the case that the cylindrical sealing portion 42 exerts a sufficient self-return force therein, it is not necessary to thicken the joint portion 48 between bellows 41 and cylindrical sealing portion 42. It is also noted that as is illustrated in FIGS. 5 and 6, the present invention may be applied to other sealing boots wherein the cylindrical sealing portion 42 is connected at its outside or inside end to the bellows portion 41.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. In a sealing boot of elastomeric material for hermetically closing an annular opening between cylindrical support and cylindrical movable members positioned to move in a relatively reciprocal relationship, said sealing boot including a bellows portion which is integrally formed at opposite ends thereof with a pair of cylindrical sealing portions attached to said support and movable members, respectively, at least one of the cylindrical sealing portions being formed to have a first end portion and a second end portion interconnected by a cylindrical portion having a cylindrical sealing surface for engaging an annular recess in one of said cylindrical support and movable members the improvement comprising:

said at least one of said cylindrical sealing portions being constructed and arranged such that at least one of said first and second end portions is radially curved away from said cylindrical sealing surface and constructed to effect rotation of said cylindrical sealing portion to cause said cylindrical sealing surface to move into contact with said annular recess.

2. A sealing boot as claimed in claim 1, wherein said at least one of the cylindrical sealing portions is constructed such that said first and second end portions are formed as annular flanks and further including a thickened portion coupled adjacent said one end portion which cooperates to effect rotation of said at least one cylindrical sealing portion from an inverted position to cause engagement of said cylindrical sealing surface with said annular recess.

3. A sealing boot as claimed in claim 1, wherein said at least one of the cylindrical sealing portions is constructed such that the other of said first and second end portions is curved radially away from the cylindrical sealing surface to cause rotation of said at least one cylindrical sealing portion so that said cylindrical sealing surface engages the annular recess.

4. A sealing boot as claimed in claim 3, wherein said at least one of the cylindrical sealing portions is further formed with a pair of tapered annular side-surfaces extending radially from the first and second end portions.

5. A sealing boot of elastomeric material for hermetically closing an annular opening between a cylindrical support member and a cylindrical movable member coupled to reciprocally move over said support member, said sealing boot including a bellows portion which is integrally formed at one end thereof with a first cylindrical sealing portion coupled over said support member and at the other end thereof with a second cylindrical sealing portion coupled within said movable member, the first sealing portion having inner and outer end portions interconnected by a cylindrical portion having a cylindrical sealing surface, said cylindrical sealing surface being formed to elastically engage an annular groove in said support member, the improvement comprising:

said inner end portion being constructed and arranged to form an annular flank which is curved radially away from the cylindrical sealing surface to effect rotation of said first cylindrical sealing portion from an inverted position so that said cylindrical sealing surface engages said annular groove.

6. A sealing boot as claimed in claim 5, wherein the first cylindrical sealing portion is constructed and arranged to form a thickened portion and further formed at its outer end with an annular flank which is curved radially away from the cylindrical sealing surface.

7. In a sealing boot constructed of flexible material and having a bellows portion and at least one cylindrical sealing portion coupled to said bellows portion, wherein said cylindrical sealing portion has first and second ends interconnected by an intermediate portion forming a cylindrical sealing surface for engaging a corresponding cylindrical surface on a moving cylindrical member, the improvement in said boot comprising:

at least one of said first and second end portions being constructed and arranged to form a curved surface such that when said curved surface contacts the cylindrical surface of said moving member, said curved surface effects rotation of said cylindrical sealing surface so that it engages said cylindrical surface of said moving cylindrical member.

8. The sealing boot of claim 7 wherein said cylindrical sealing portion further includes means for causing rotation of said cylindrical sealing surface from an inverted position into engagement with the cylindrical surface of said moving cylindrical member.

9. The sealing boot of claim 8 wherein said means for causing rotation is a portion of said bellows adjacent said cylindrical sealing portion which is thickened relative to the thickness of the bellows portion.

* * * * *